(12) United States Patent
Sadberry

(10) Patent No.: US 11,939,018 B2
(45) Date of Patent: Mar. 26, 2024

(54) POWER PEGS STAND

(71) Applicant: Kim Andrew Sadberry, Tomball, TX (US)

(72) Inventor: Kim Andrew Sadberry, Tomball, TX (US)

( * ) Notice: Subject to any disclaimer, the term of this patent is extended or adjusted under 35 U.S.C. 154(b) by 553 days.

(21) Appl. No.: 17/331,642

(22) Filed: May 27, 2021

(65) Prior Publication Data

US 2021/0387687 A1    Dec. 16, 2021

Related U.S. Application Data

(60) Provisional application No. 63/038,881, filed on Jun. 14, 2020.

(51) Int. Cl.
*B62H 1/06*    (2006.01)

(52) U.S. Cl.
CPC ..................... *B62H 1/06* (2013.01)

(58) Field of Classification Search
CPC ....................................... B62H 1/06
See application file for complete search history.

(56) References Cited

U.S. PATENT DOCUMENTS

| | | | | |
|---|---|---|---|---|
| 10,780,931 | B2 * | 9/2020 | Siwicki | F15B 1/26 |
| 2004/0256835 | A1 * | 12/2004 | Royal, Sr. | B62H 1/12 |
| | | | | 280/293 |
| 2005/0156403 | A1 * | 7/2005 | Labonte | B62H 1/00 |
| | | | | 280/304 |
| 2008/0100030 | A1 * | 5/2008 | Brakhage | B62H 1/04 |
| | | | | 280/293 |
| 2010/0013186 | A1 * | 1/2010 | Markie | B62H 1/06 |
| | | | | 280/297 |

FOREIGN PATENT DOCUMENTS

| | | | | |
|---|---|---|---|---|
| CA | 2541495 A1 | * | 6/2006 | ............... B62H 1/06 |
| CN | 2355953 Y | * | 12/1999 | |
| CN | 105966497 A | * | 9/2016 | ............... B62H 1/00 |
| JP | H05238442 A | * | 9/1993 | |

* cited by examiner

*Primary Examiner* — Kevin Hurley
(74) *Attorney, Agent, or Firm* — Nolte Lackenbach Siegel

(57) ABSTRACT

A motor is coupled to a rocker switch. A threaded shaft is mechanically coupled to the motor. A threaded fitting is coupled to the threaded shaft. The threaded fitting has a first leg and a second leg positioned substantially opposite the first leg. A first foot is coupled substantially perpendicular to the first leg. A second foot is coupled substantially perpendicular to the second leg. The peg brace is coupled to the first leg and the second leg.

19 Claims, 6 Drawing Sheets

POWER PEGS STAND

CROSS-REFERENCE TO RELATED APPLICATIONS

This application claims the benefit of U.S. Provisional Application No. 63/038,881, filed Jun. 14, 2020.

BACKGROUND

Motorcycles are heavy. A motorcycle's weight may range from two hundred pounds to a thousand pounds depending on the model. To support this weight, motorcycles are held in an angled position by a single kickstand. Unfortunately, motorcycles must be tilted to one side to effectively engage the kickstand with the ground. This shifted distribution of weight towards one side could result in the motorcycle falling over on its side if the kickstand is not fully engaged. Injury could result if the rider does not have the strength to stabilize the motorcycle or forget to fully engage the kickstand. Stabilizing a motorcycle without having to lean the motorcycle on a single kickstand is a challenge.

DETAILED DESCRIPTION

The following detailed description illustrates embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Various substitutions, modifications, additions, and rearrangements may be made that remain potential applications of the disclosed techniques. Therefore, the description that follows is not to be taken as limiting on the scope of the appended claims. In particular, an element associated with a particular embodiment should not be limited to association with that particular embodiment but should be assumed to be capable of association with any embodiment discussed herein.

Motorcycles are heavy machines. A motorcycle's weight may range from two hundred pounds to a thousand pounds depending on the model. For example, dirt bikes may weigh one hundred eighty pounds, whereas touring bikes may weigh up to nine hundred pounds. To support this weight, motorcycles are held in an angled position by a single kickstand. This lean angle could range from ten degrees to twenty degrees depending on the model of the bike and positioning of the front wheel. Unfortunately, the rider must tilt the motorcycle to one side to effectively engage the kickstand with the ground. This shifted center of gravity towards one side could result in the motorcycle falling over if the kickstand is not fully engaged with the ground. The rider could injure themselves if the rider does not have the strength to manage the motorcycle or forget to fully engage the kickstand.

The embodiments described herein removes the necessity to lean the motorcycle to one side to engage the motorcycle's kickstand with the ground. Specifically, the embodiments describe removing the requirement for a general kickstand and replaces it with a power pegs stand that allows a rider to fully stabilize a motorcycle without having to lean the motorcycle. The power pegs stand is an apparatus that is coupled to the motorcycle's frame, along the motorcycle's center of axis and when engaged two legs are extended towards the ground securing the bike in a stationary position. The power pegs stand may also be coupled to the motorcycles existing crash guards or after market crash guards if the frame is covered or inaccessible. The dimensions of the power pegs stand, and its components, may vary in size to accommodate different bike models, however, the mechanical framework of the apparatus is the same.

Figure 1:
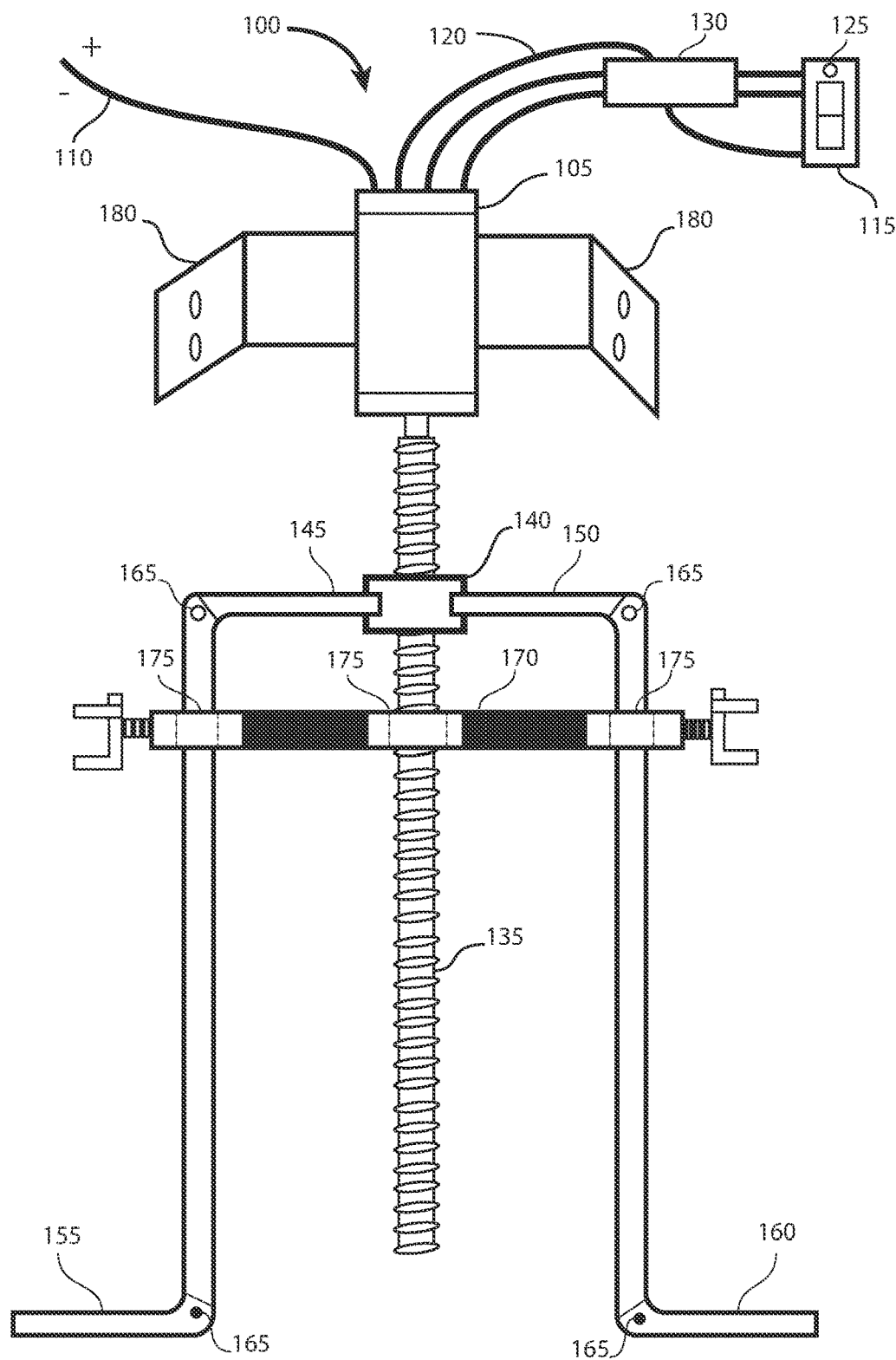
FIG. 1 is schematic view of a power pegs stand.

FIG. 1 is schematic view of a power pegs stand. As illustrated in FIG. 1, the power pegs stand 100 is an electromechanical apparatus that is coupled to a motorcycle frame (not illustrated in FIG. 1 but illustrated in FIGS. 2-5) and is used to stabilize a motorcycle. The power pegs stand 100 may include a direct current (DC) motor 105 which is supplied with power from the motorcycle's battery (illustrated by reference number 110). In one or more embodiments, the motor 105 is operated using pneumatic power. The motor 105 may be a six-, twelve-, or twenty-four-volt direct current motor. In one or more embodiments, the motor 105 may include a rechargeable battery for situations in which the motorcycle's battery 110 is inoperable and the power pegs stand 100 needs to be fully engaged.

The motor 105 may include a rocker switch 115. The rocker switch 115 may be electronically coupled to the motor 105 by an eight gauged three conductor stranded wire 120. The rocker switch 115 is the apparatus that is toggled by the rider (not illustrated) to engage or disengaged the power pegs stand 100. The rocker switch 115 may be a toggle switch. In another embodiment, the rocker switch 115 may be a push button switch. In one or more embodiments, the rocker switch 115 may include an indicator light to inform the rider the current position of the power pegs stand 100. For example, the indicator light 125 may illuminate red with the power pegs stand 100 is engaged and illuminate green with the power pegs stand 100 is disengaged. Alternatively, the indicator light 125 my illuminate any color when the power pegs stand 100 is engaging and deactivates when the power pegs stand 100 is fully disengaged. The rocker switch 115 may be coupled to a clutch handle 130. Similar to how kickstands will deactivate the motorcycle's engine when the kickstand is engaged, the rocker switch 115 is deactivated by the clutch handle 130 if the power pegs stand 100 is not in a safe riding position. For example, if the power pegs stand 100 is in the engaged positioned (i.e., contact with the surface), the motorcycle's engine will deactivate if the rider mistakenly changes the motorcycle's gears away from the neutral position.

As illustrated in FIG. 1, the power pegs stand 100 may include a threaded shaft 135 mechanically coupled to the motor 105. In one or more embodiments, when the motor 105 is engaging, the threaded shaft 135 rotates at speeds ranging from sixty to one hundred twenty rotations per minute. The threaded shaft 135 may be manufactured from stainless steel or other similar alloys. The length of the threaded shaft 135 may vary dependent on its application (i.e., motorcycle model type), but may range from a length of between six inches (i.e., 15.24 centimeters) to twenty-four inches (60.96 centimeters).

Further illustrated in FIG. 1, the power pegs stand 100 may include a threaded fitting 140 coupled to the threaded shaft 135. The threaded fitting 140 may have an internal thread pattern that compliments the external thread pattern of the threaded shaft 135. In one or more embodiments, when the threaded shaft 135 is engaged (i.e., rotating) by the motor 105, the threaded fitting 140 travels along the threaded shaft 135 either towards the ground or towards the motor 105. However, the threaded fitting 140 will only travel along the threaded shaft 135 if it's secured to the frame of the motorcycle which is described below in connection to FIGS. 2-5.

In one or more embodiments, as illustrated in FIG. 1, the threaded fitting 140 may include a first leg 145. The threaded fitting 140 may include a second leg 150 positioned substantially opposite the first leg 145. For example, if the first leg 145 is positioned at zero degrees along a plane, the second leg 150 may be positioned between one hundred thirty degrees and one hundred eighty degrees away from the first leg 145. This variation in the degree of angle of the legs (i.e., first leg 145 and second leg 150) allows for any complimentary positioning of the power pegs stand 100 with the motorcycle's frame. In one or more embodiments, the first leg 145 may be integrally coupled to the threaded fitting 140. In one or more embodiments, the second leg 150 may be integrally coupled to the threaded fitting 140.

The first leg 145 may include a first foot 155. The first foot 155 may be coupled substantially perpendicular (i.e., within one, five, or ten degrees) to the first leg 145. In one or more embodiments, the second leg 150 includes a second foot 160. The second foot 160 may be coupled substantially perpendicular (i.e., within one, five, or ten degrees) to the second leg 150.

As illustrated in FIG. 1, the first leg 145, second leg 150, first foot 155, and second foot 160 may include joints 165. The joints 165 allows the legs (i.e., first leg 145 and second leg 150) and feet (i.e., first foot 155 and second foot 160) to pivot and flex when placed under pressure due to the load of the motorcycle.

In one or more embodiments, as illustrated in FIG. 1, the power pegs stand 100 may include a peg brace 170 coupled to the first leg 145 and second leg 150. The peg brace 170 may be coupled to the motorcycle's frame. The peg brace 170 may couple to the motorcycle's frame using clamps, bolts, or in some embodiments integrally welded onto the frame. The peg brace 170 may include a bore 175 (illustrated by the dashed lines) for the threaded shaft 135, the first leg 145, and the second leg 150 to travel through. In other embodiments, depending on the frame angle of the motorcycle, the threaded shaft 135, the first leg 145, and the second leg 150 may not travel through the bore 175 but travel either in front of or behind the peg brace 170.

The power pegs stand 100 may also include motor mounts 180. The motor mounts 180 are coupled to the motor 105. In one or more embodiments, the motor mounts 180 are coupled to the frame of a motorcycle.

Figure 2:
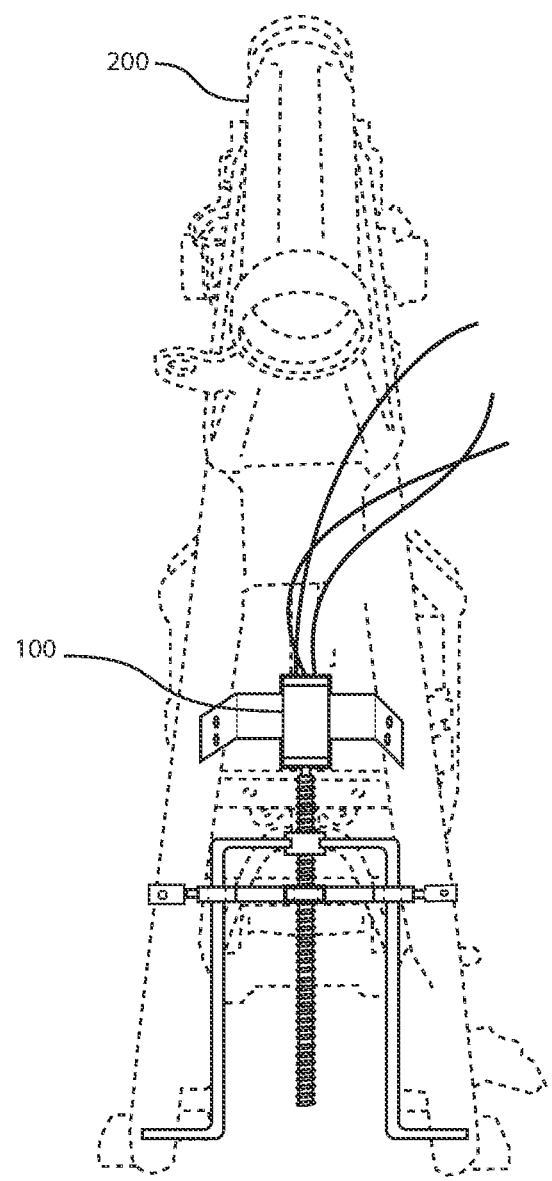
FIG. 2 is a frontal view of a power pegs stand coupled to a motorcycle frame.
Figure 3:
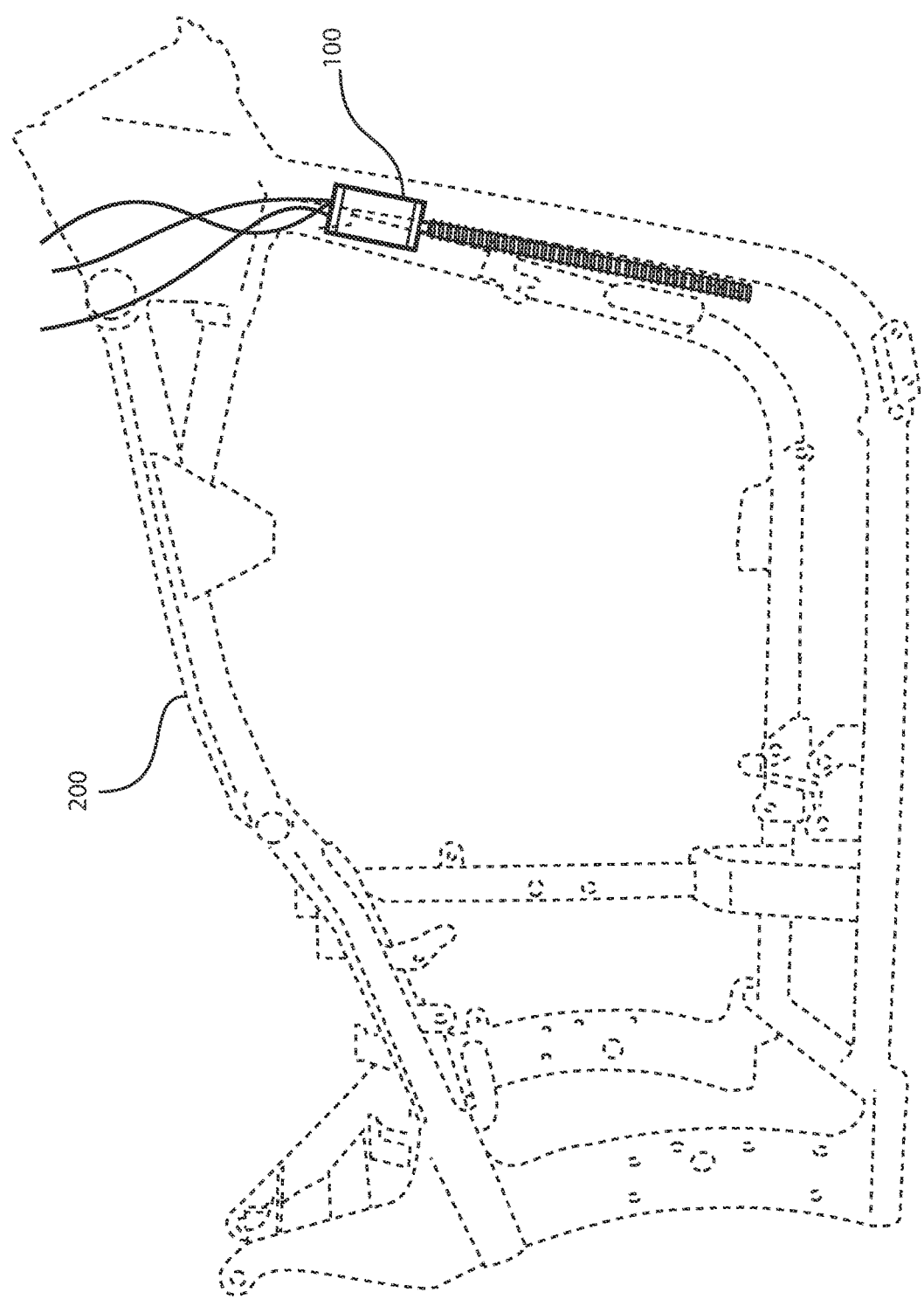
FIG. 3 is a profile view of a power pegs stand coupled to a motorcycle frame.
Figure 4:
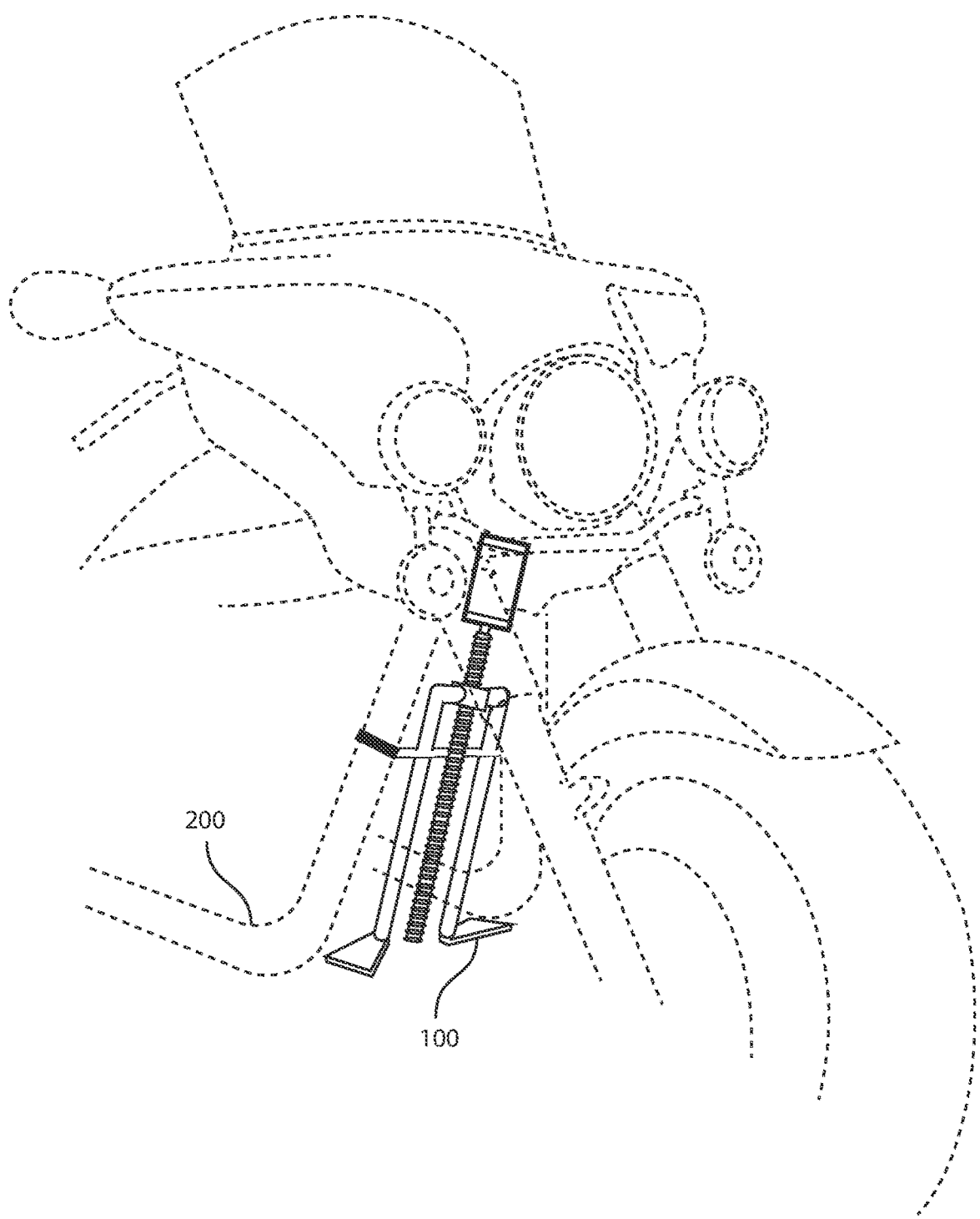
FIG. 4 is a perspective view of a power pegs stand coupled to a motorcycle.

FIG. 2 is a frontal view of a power pegs stand coupled to a motorcycle frame. FIG. 3 is a profile view of a power pegs stand coupled to a motorcycle frame. FIG. 4 is a perspective view of a power pegs stand coupled to a motorcycle. Note, in FIG. 3 the power pegs stand 100 is not fully illustrated for clarity. As illustrated in FIG. 2, the power pegs stand 100 may be coupled to a motorcycle frame 200. The power pegs stand 100 may be coupled to the front "A-frame" of the motorcycle frame 200. For example, one motor mount 180 and one end of the peg brace 170 may be coupled to one arm of the "A-frame" and the second motor mount 180 and the second end of the peg brace 170 may be coupled to the second arm of the "A-frame." In another embodiment, the power pegs stand 100 may be coupled to crash guards (not shown) that are itself coupled to the motorcycle frame 200.

Coupling the peg brace 170 to the motorcycle frame 200 restricts the threaded fitting 140 from rotating with the threaded shaft 135 (i.e., when the motor 105 is engaged), thus forcing the threaded fitting 140 to travel down the threaded shaft 135, extending the legs (i.e., first leg 145 and second leg 150) toward the ground.

Figure 5:
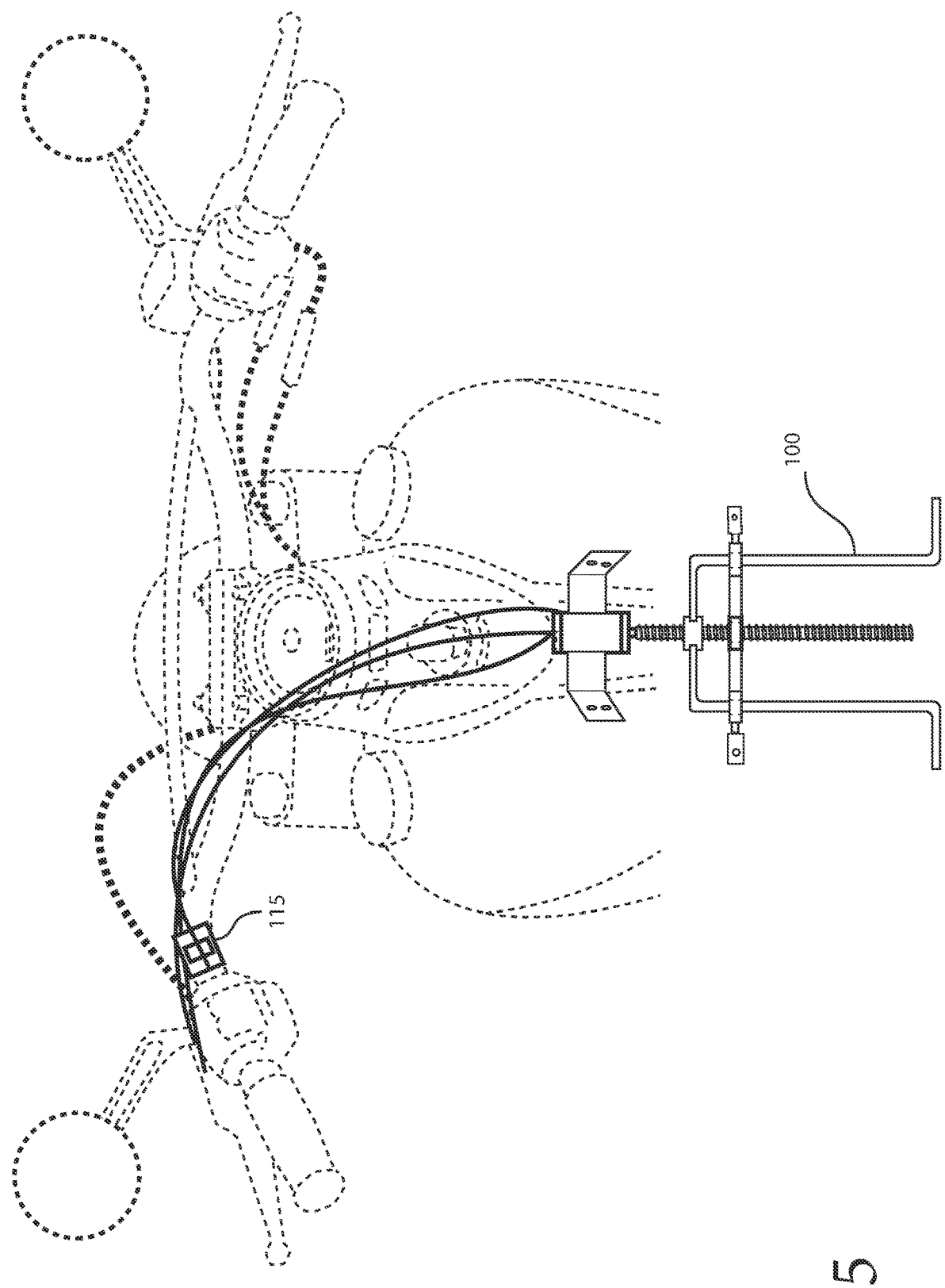
FIG. 5 is a plan view of a power pegs stand coupled to a motorcycle.

FIG. 5 is a plan view of a power pegs stand coupled to a motorcycle. As illustrated in FIG. 5, from a rider's perspective the rocker switch 115 is located on clutch side (i.e., left handlebar). Once the rider is fully stopped (i.e., the motorcycle is not moving) and the motorcycle is in the neutral position, the rocker switch 115 becomes operable. Once the rocker switch 115 is operable, the rider may activate the power pegs stand 100 to stabilize the motorcycle.

Figure 6:
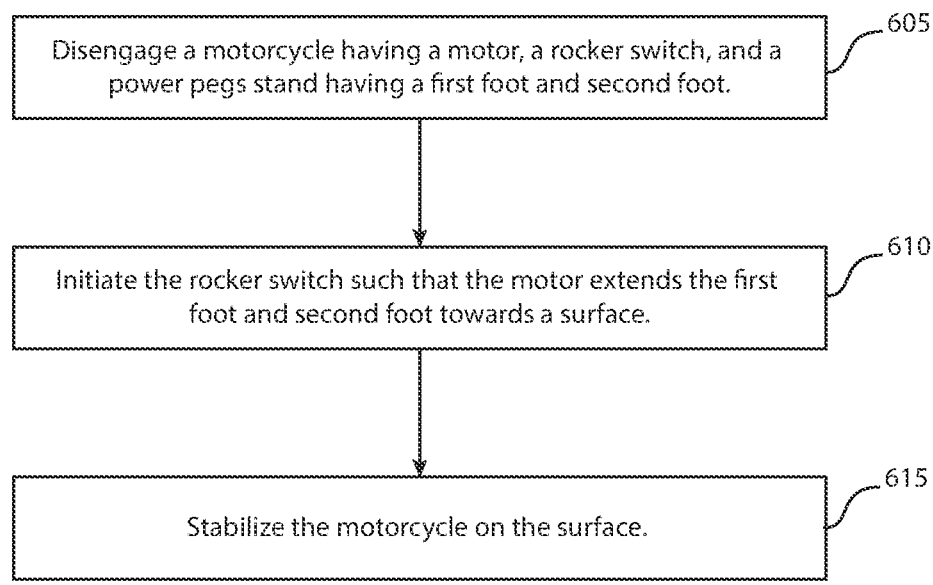
FIG. 6 is flow chart illustrating the method of using a power pegs stand.

FIG. 6 is flow chart illustrating the method of using a power pegs stand. In operation, an operator (not shown) disengages a motorcycle having a motor (such as motor 105), a rocker switch (such as rocker switch 115), and a power pegs stand (such as power pegs stand 100) having a first foot (such as first foot 155) and a second foot (such as second foot 160) (block 605). The rocker switch (such as rocker switch 115) is initiated such that the motor (such as motor 105) extends the first foot (such as first foot 155) and second foot (such as second foot 160) towards a surface (block 610). The motorcycle is stabilized on the surface (block 615).

In one aspect, the apparatus includes a motor coupled to a rocker switch. A thread shaft is mechanically coupled to the motor. A threaded fitting is coupled to the threaded shaft. The threaded shaft has a first leg and a second leg substantially opposite the first leg. A first foot is coupled substantially perpendicular to first leg. A second foot is coupled substantially perpendicular to the second leg. A peg brace is coupled to the first leg and the second leg.

In one or more embodiments, the power pegs stand 100 may include a hydraulic motor to perpetuate lowering and raising the first leg 145 and second leg 150. In this variation the threaded shaft 135 extracts and retracts the first leg 145 and the second leg 150 and is affixed by the peg brace 170 attached to the threaded shaft 135 of the hydraulic motor.

In one or more embodiments, the power pegs stand 100 may include a motor powering a square saw-toothed shaft and gear to perpetuate lowering and raising the first leg 145 and second leg 150 (not illustrated). In this variation the gear and motor powers the square saw-toothed shaft 136 extracts and retracts the first leg 145 and the second leg 150 is affixed by the peg brace 170 attached to the square saw-toothed shaft and gear 136 powered by the electric motor.

Implementations may include one or more of the following. The motor may be powered by direct current. The motor may be deactivated by a clutch handle coupled to a motorcycle. The rocker switch may be electronically coupled to the motor by an eight gauged three conductor stranded wire. The first foot may be pivotally coupled to the first leg and the second foot may be pivotally coupled to the second leg. The first leg may be integrally coupled to the threaded fitting and the second leg may be integrally coupled to the threaded fitting. The threaded shaft may be comprised of stainless steel.

In one aspect, the method includes disengaging a motorcycle having a power pegs stand. The power pegs stand has a motor coupled to a rocker switch. A thread shaft is mechanically coupled to the motor. A threaded fitting is coupled to the threaded shaft. The threaded shaft has a first leg and a second leg substantially opposite the first leg. A first foot is coupled substantially perpendicular to first leg. A second foot is coupled substantially perpendicular to the second leg. A peg brace is coupled to the first leg and the second leg. The rocker switch is initiated such that the motor extends the first foot and the second foot towards a surface. The motorcycle is stabilized on the ground.

Implementations may include one or more of the following. The motor may be powered by direct current. The motor may be deactivated by a clutch handle coupled to a motorcycle. The rocker switch may be electronically coupled to the motor by an eight gauged three conductor stranded wire. The first foot may be pivotally coupled to the first leg and the second foot may be pivotally coupled to the second leg. The first leg may be integrally coupled to the threaded fitting and the second leg may be integrally coupled to the threaded fitting. The threaded shaft may be comprised of stainless steel.

In one aspect, the system includes a motorcycle having a frame. A power pegs stand is coupled to the frame. The power pegs stand has a motor coupled to a rocker switch. A thread shaft is mechanically coupled to the motor. A threaded fitting is coupled to the threaded shaft. The threaded shaft has a first leg and a second leg substantially opposite the first leg. A first foot is coupled substantially perpendicular to first leg. A second foot is coupled substantially perpendicular to the second leg. A peg brace is coupled to the first leg, the second leg, and the frame.

Implementations may include one or more of the following. The motor may be powered by direct current. The motor may be deactivated by a clutch handle coupled to a motorcycle. The rocker switch may be electronically coupled to the motor by an eight gauged three conductor stranded wire. The first foot may be pivotally coupled to the first leg and the second foot may be pivotally coupled to the second leg. The first leg may be integrally coupled to the threaded fitting and the second leg may be integrally coupled to the threaded fitting. The threaded shaft may be comprised of stainless steel.

The operations of the flow diagrams are described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

The word "coupled" herein means a direct connection or an indirect connection.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An apparatus comprising:
   a motor coupled to a rocker switch;
   a threaded shaft mechanically coupled to the motor;
   a threaded fitting coupled to the threaded shaft, the threaded fitting having:
     a first leg; and
     a second leg positioned substantially opposite the first leg;
   a first foot coupled substantially perpendicular to the first leg;
   a second foot coupled substantially perpendicular to the second leg; and
   a peg brace coupled to the first leg and second leg.

2. The apparatus of claim 1 wherein the motor is powered by direct current.

3. The apparatus of claim 1 wherein the motor is deactivated by a clutch handle coupled to a motorcycle.

4. The apparatus of claim 1 wherein the rocker switch is electronically coupled to the motor by an eight gauged three conductor stranded wire.

5. The apparatus of claim 1 wherein the first foot is pivotally coupled to the first leg and the second foot is pivotally coupled to the second leg.

6. The apparatus of claim 1 wherein the first leg is integrally coupled to the threaded fitting and the second leg is integrally coupled to the threaded fitting.

7. The apparatus of claim 1 wherein the threaded shaft is comprised of stainless steel.

8. A method comprising:
   disengaging a motorcycle having a power pegs stand, the power pegs stand having:
     a motor coupled to a rocker switch;
     a threaded shaft mechanically coupled to the motor;
     a threaded fitting coupled to the threaded shaft, the threaded fitting having:
       a first leg; and
       a second leg positioned substantially opposite the first leg;
     a first foot coupled substantially perpendicular to the first leg;
     a second foot coupled substantially perpendicular to the second leg; and
     a peg brace coupled to the first peg leg and second leg;
   initiating the rocker switch such that the motor extends the first foot and second foot towards a surface; and
   stabilizing the motorcycle on the surface.

9. The method of claim 8 wherein the motor is powered by direct current.

10. The method of claim 8 wherein the motor is deactivated by a clutch handle coupled to a motorcycle.

11. The method of claim 8 wherein the rocker switch is electronically coupled to the motor by an eight gauged three conductor stranded wire.

12. The method of claim 8 wherein the first foot is pivotally coupled to the first leg and the second foot is pivotally coupled to the second leg.

13. The method of claim 8 wherein the first leg is integrally coupled to the threaded fitting and the second leg is integrally coupled to the threaded fitting.

14. The method of claim 8 wherein the threaded shaft is comprised of stainless steel.

15. A system comprising:
   a motorcycle having a frame;
   a power pegs stand coupled to the frame, the power pegs stand having:
     a motor coupled to a rocker switch;
     a threaded shaft mechanically coupled to the motor;

a threaded fitting coupled to the threaded shaft, the
threaded fitting having:
a first leg; and
a second leg positioned substantially opposite the
first leg;
a first foot coupled substantially perpendicular to the
first leg;
a second foot coupled substantially perpendicular to the
second leg; and
a peg brace coupled to the first leg, second leg, and the
frame.

16. The apparatus of claim 15 wherein the motor is powered by direct current.

17. The apparatus of claim 15 wherein the motor is deactivated by a clutch handle coupled to the frame.

18. The apparatus of claim 15 wherein the rocker switch is electronically coupled to the motor by an eight gauged three conductor stranded wire.

19. The apparatus of claim 15 wherein the first foot is pivotally coupled to the first leg and the second foot is pivotally coupled to the second leg.

\* \* \* \* \*